US012207354B2

(12) United States Patent
Shekhar et al.

(10) Patent No.: US 12,207,354 B2
(45) Date of Patent: Jan. 21, 2025

(54) FACILITATING SERVICES FOR DEVICES IN PRIVATE MOBILE NETWORKS BASED ON DEVICE AUTHENTICATIONS IN AN OPERATOR NETWORK

(71) Applicant: Cisco Technology, Inc., San Jose, CA (US)

(72) Inventors: Ravi Shekhar, Maharashtra (IN); Vimal Srivastava, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 409 days.

(21) Appl. No.: 17/833,320

(22) Filed: Jun. 6, 2022

(65) Prior Publication Data

US 2023/0396983 A1   Dec. 7, 2023

(51) Int. Cl.
*H04B 7/00* (2006.01)
*H04L 9/40* (2022.01)
(Continued)

(52) U.S. Cl.
CPC ......... *H04W 8/186* (2013.01); *H04L 63/0272* (2013.01); *H04L 67/55* (2022.05); *H04W 12/06* (2013.01)

(58) Field of Classification Search
CPC .......... H04W 8/04; H04W 8/06; H04W 8/08; H04W 8/10; H04W 8/186; H04W 12/06;
(Continued)

(56) References Cited

U.S. PATENT DOCUMENTS 11,844,142 B2 *  12/2023  Ying .................... H04W 48/16
11,962,998 B2 *   4/2024  Yang .................... H04W 12/02
(Continued)

FOREIGN PATENT DOCUMENTS

CN      110049484 A      7/2019
WO    2020/149240 A1    7/2020

OTHER PUBLICATIONS

3GPP, "3rd Generation Partnership Project; Technical Specification Group Services and System Aspects; Procedures for the 5G System (5GS); Stage 2 (Release 17)," 3GPP TS 23.502, V17.4.0, Technical Specification, Mar. 2022, 738 pages.
(Continued)

*Primary Examiner* — Tuan Pham
(74) *Attorney, Agent, or Firm* — Edell, Shapiro & Finnan, LLC

(57) ABSTRACT

In one illustrative example, a unified data management (UDM) of a mobile network is established in a UDM set with a plurality of private network UDMs instances of a plurality of private mobile networks. The UDM of the mobile network provides access to a plurality of subscription profiles associated with a plurality of subscribers of the mobile network, and each private network UDM instance provides access to a subset of the subscription profiles associated with a subset of the subscribers in the private mobile network. The UDM of the mobile network operates to communicate, in an authentication procedure, authentication data for authentication of a user equipment (UE) in the mobile network. After the authentication of the UE in the mobile network, the UDM operates to push authentication status information of the UE to the private network UDM instance of the private mobile network.

20 Claims, 10 Drawing Sheets

(51) Int. Cl.
*H04L 67/55* (2022.01)
*H04W 8/18* (2009.01)
*H04W 12/06* (2021.01)

(58) Field of Classification Search
CPC .... H04W 12/082; H04W 12/72; H04L 67/55; H04L 63/0272
See application file for complete search history.

(56) References Cited

U.S. PATENT DOCUMENTS

| | | |
|---|---|---|
| 2020/0359194 A1 | 11/2020 | Kim et al. |
| 2021/0029208 A1 | 1/2021 | Chen et al. |
| 2021/0329583 A1 | 10/2021 | Baek et al. |
| 2021/0392605 A1 | 12/2021 | Park et al. |
| 2022/0264310 A1* | 8/2022 | Tamura ................. H04W 48/18 |

OTHER PUBLICATIONS

3GPP, "3rd Generation Partnership Project; Technical Specification Group Services and System Aspects; System architecture for the 5G System (5GS); Stage 2 (Release 17)," 3GPP TS 23.501, V17.4.0, Technical Specification, Mar. 2022, 567 pages.

3GPP, "3rd Generation Partnership Project; Technical Specification Group Core Network and Terminals; 5G System; Session Management Services; Stage 3 (Release 17)," 3GPP TS 29.502, V17.4.0, Technical Specification, Mar. 2022, 320 pages.

3GPP, "3rd Generation Partnership Project; Technical Specification Group Core Network and Terminals; Interface between the Control Plane and the User Plane Nodes; Stage 3 (Release 17)," 3GPP TS 29.244, V17.4.0, Technical Specification, Mar. 2022, 370 pages.

China Telecom, "Moderated Email Discussion summary for FS_ESSIND," S2-2108990, 3GPP TSG-SA WG2#148E e-meeting, Nov. 2021, 7 pages.

* cited by examiner

FACILITATING SERVICES FOR DEVICES IN PRIVATE MOBILE NETWORKS BASED ON DEVICE AUTHENTICATIONS IN AN OPERATOR NETWORK

TECHNICAL FIELD

The present disclosure relates generally to telecommunications systems, and more particularly to techniques and mechanisms for facilitating services for devices in private mobile networks based on device authentications in an operator network, with use of a Unified Data Management (UDM) set.

BACKGROUND

With the evolution of the Fifth Generation (5G) system, the deployment of industry-specific private mobile networks or "vertical networks" is becoming a reality. A vertical network emphasizes 5G customization and often includes only specific, limited types of Network Functions (NFs). The limited types of NFs in the vertical network may include an Access and Mobility Management Function (AMF), a Session Management Function (SMF), a User Plane Function (UPF), and/or a Unified Data Management (UDM) which stores subscription data only for users of the vertical network.

Industry-specific vertical networks will co-exist with the operator network (or Public Land Mobile Network "PLMN"). Each vertical network will make use of services of the operator network for procedures, such as device authentication, prior to device attachment to the vertical network.

Specifically, Third Generation Partnership Project (3GPP) R18 Study Item (FS_ESSIND) indicates two (2) possible cases regarding vertical networks:
- Case 1: Dedicated AMF, SMF and UPF (and no other NFs) are deployed in the vertical network.
- Case 2: Dedicated AMF, SMF, UPF, and UDM containing subscription data for only vertical users/customers are deployed in the vertical network; the UDM of the operator network performs authentication procedures for the devices (i.e., the Authentication Server Function "AUSF"/UDM/Home Subscriber Server "HSS").

Again, vertical networks will co-exist with and use services of the operator network for procedures, such as device authentication, prior to device attachment to the vertical network. It is preferred that authentication procedures be performed using mechanisms (e.g., the UDM) located in the operator network for security reasons (e.g., so that authentication credentials are maintained within the operator network). On the other hand, the UDM deployed in vertical network (i.e., Case 2 above) may be used for service authorizations or other subscription-related use cases.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DESCRIPTION OF EXAMPLE EMBODIMENTS

Figure 1A:
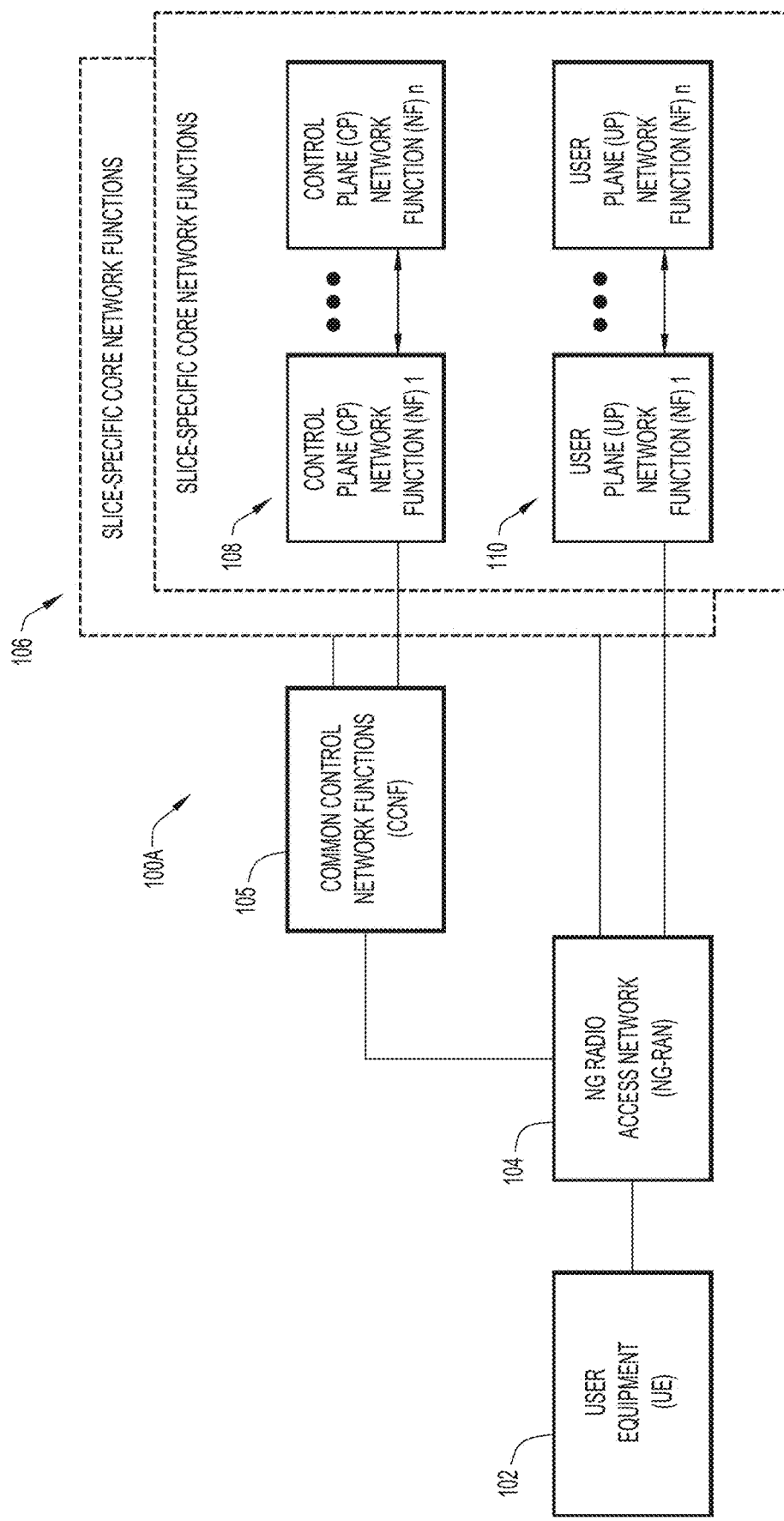
FIG. 1A is an illustrative representation of a basic network architecture of a Fifth Generation (5G) network (also referred to herein more generally as a mobile network or an operator network)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms are described herein for facilitating services for devices in private mobile networks based on device authentications in an operator network and use of a Unified Data Management (UDM) set.

In one illustrative example, a UDM of a mobile network is established in a UDM set with a plurality of private network UDMs instances of a plurality of private mobile networks. The UDM of the mobile network provides access to a plurality of subscription profiles associated with a plurality of subscribers of the mobile network, and each private network UDM instance provides access to a subset of the subscription profiles associated with a subset of the subscribers in a private mobile network. The UDM of the mobile network operates to communicate, in an authentication procedure, authentication data for authentication of a user equipment (UE) in the mobile network. After the authentication of the UE in the mobile network, the UDM of the mobile network operates to push authentication status information of the UE to the private network UDM instance of the private mobile network associated with the UE.

In another illustrative example, a mobility management function for use in a mobile network operates to manage a registration procedure for the UE. The registration procedure includes an authentication procedure with use of a UDM of the mobile network, where the UDM is established in a UDM set with one or more private network UDMs instances of one or more private mobile networks. In the registration procedure, the mobility management function of the mobile network operates to obtain, from the UDM of the mobile network, subscription profile data associated with the UE. The subscription profile data identifies one of the private mobile networks associated with the UE. The mobility management function operates to perform a configuration procedure with the UE, for configuring the UE with an identity or an address of a private network mobility management function of the private mobile network associated with the UE. The configuration procedure enables the UE to communicate a message which indicates a session establishment request to the private network mobility management function of the private mobile network. This message is for initiation of a session establishment procedure for the UE with use of a private network UDM instance of the private mobile network, where the private network UDM instance is in the UDM set.

More detailed and alternative techniques and implementations are provided herein as described below.

EXAMPLE EMBODIMENTS

As described in the Background section, industry-specific vertical networks will co-exist with an operator network and will use services of the operator network for procedures, such as device authentication, prior to device attachment to the vertical network. It is preferred that authentication procedures are performed via the mechanisms (e.g., Unified Data Management "UDM") located in the operator network for security reasons (e.g., so that authentication credentials are maintained within the operator network). On the other hand, the UDM deployed in vertical network (i.e., Case 2 above) may be used for service authorizations or other subscription-related use cases.

It would be advantageous if the UDMs (e.g., the UDM in the vertical network and the UDM in the operator network) were always or regularly in sync, and if the vertical network was aware of whether or not the device was already authenticated by the operator network. It would also be advantageous to limit the traffic and procedures to be performed in the operator network once the device is connected in the vertical network.

What are described herein are techniques and mechanisms for use in facilitating communications for devices connecting in vertical networks (e.g., industry-specific private 5G networks) using authentication services of an operator network (i.e., a Public Land Mobile Network "PLMN"), with use of a UDM set of UDM instances spread across both the operator and vertical networks. Thus, in some implementations of the present disclosure, all of the UDMs (i.e., the operator UDM in the operator network and the vertical UDM(s) in the vertical network(s)) may be brought into a single UDM set, based on the concept of an NF set as described in Third Generation Partnership Project (3GPP) standards.

To better explain in relation to the figures, FIG. 1A is an illustrative representation of a general network architecture 100A of a Fifth Generation (5G) network. The 5G network may be referred to herein more generally as an operator network, a mobile network, and/or a 3GPP-based mobile network. As illustrated, network architecture 100A of the 5G network includes common control network functions (CCNF) 105 and a plurality of slice-specific core network functions 106. With network architecture 100A, the 5G network may be configured to facilitate communications for a UE 102. UE 102 may obtain access to the 5G network via a radio access network (RAN) or a Next Generation (NG) RAN (NG-RAN) 104. NG-RAN 104 may include one or more base stations or gNodeBs (gNBs), such as a gNB 107. UE 102 may be any suitable type of device, such as a cellular telephone, a smart phone, a tablet device, an Internet of Things (IoT) device, a Machine-to-Machine (M2M) device, and a sensor, to name but a few.

Network architecture 100A of the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected NFs, each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105. On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a Session Management Function (SMF), whereas UP NFs 110 may include, for example, a User Plane Function (UPF).

Figure 1B:
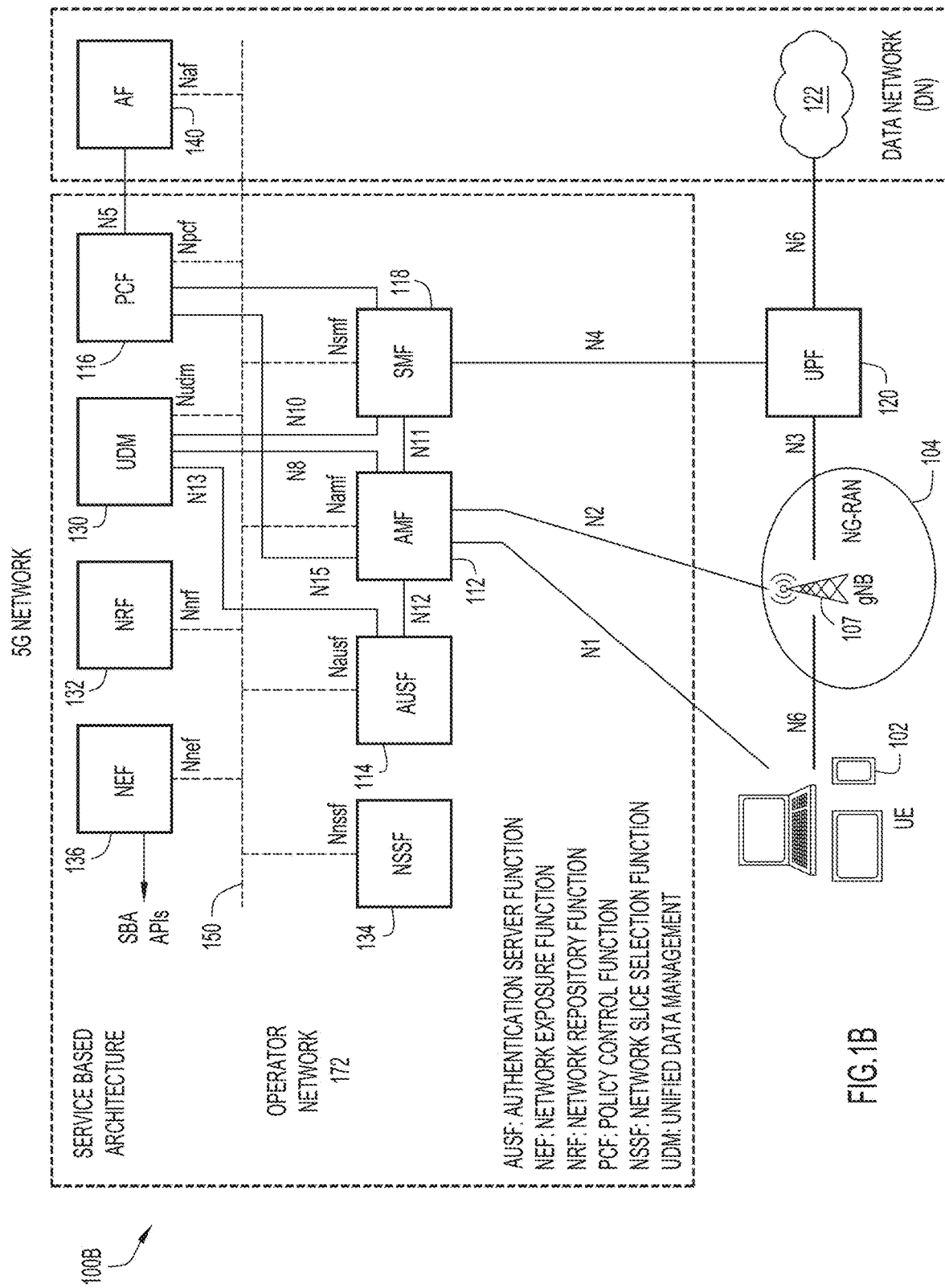
FIG. 1B is an illustrative representation of a more detailed network architecture of the 5G network of FIG. 1A, showing a Service-Based Architecture (SBA) or an enhanced SBA (eSBA) of the 5G network.

FIG. 1B is an illustrative representation of a more detailed network architecture 100B of the 5G network of FIG. 1A. As provided in 3GPP standards for 5G (e.g., 3GPP Technical Specification or "TS" 23.501 and 3GPP TS 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. Other NFs in the 5G network include an NSSF 134, a network exposure function (NEF) 136, an NF repository function (NRF) 132, and a UDM 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and all other NFs (i.e. AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling. For communications of UE 102 via UPF 120, SMF 118 may maintain a Packet Forward Control Protocol (PFCP) session with UPF 120 over an N4 interface. An N4 connection may be established for every Protocol Data Unit (PDU) session that is created by UE 102 so that SMF 118 may control the session.

The SBA of the 5G network is better illustrated in FIG. 1B, again whereby the control plane functionality and common data repositories are provided by way of the set of interconnected NFs. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g., using Hypertext Transfer Protocol "HTTP" 2.0). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140.

Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and service level agreements (SLAs), and may include the virtualized resources required to service the needs of a Mobile Virtual Network Operator (MVNO) or group of subscribers, including a dedicated UPF 120, SMF 118, and PCF 116.

One or more application functions, such as an Application Function (AF) 140 may connect to the 5G network. AF 140 may interact with the network via NEF 136 in order to access network capabilities. NEF 136 may securely expose network capabilities and events provided by NFs to AF 140, and may provide a means for AF 140 to securely provide information to the 5G network.

UDM 130 may provide services to SBA functions, such as AMF 112, AUSF 114, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context. AUSF 114 provides for authentication, and may rely on a backend service for computing authentication data and keying materials.

In general, an "NF instance" is an identifiable instance of an NF. NRF 132 may maintain NF profiles of available NF instances and their associated services, and support a service discovery function for service discovery associated with the NF profiles. NF profiles of NF instances maintained in NRF 132 may include NF instance ID, NF type (e.g., AMF, SMF, PCF, UPF, etc.), network slice identifiers such as NSI ID, NF capacity information, names of supported services, etc. For service discovery, NRF 132 may receive a discovery request from an NF instance and provide information associated with the discovered NF instance to the NF instance in response.

The SBA of the 5G network of FIG. 1B may be an enhanced SBA (eSBA) architecture which was introduced in 3GPP TS 23.501 for Release 16. The eSBA architecture introduced what are referred to as an NF Set and an NF Service Set (see, e.g., 3GPP TS 29.244, Release 16, 17, and beyond). An NF Set is a group of interchangeable NF instances of the same type, supporting the same services and the same network slice. The NF instances of the same NF Set may be geographically distributed but have access to the same context data. On the other hand, an NF service is a functionality exposed by an NF through the SBI and consumed by other authorized NFs. An NF service instance is an identifiable instance of an NF service, and an NF service operation is an elementary unit of which an NF service is composed. An NF Service Set is a group of interchangeable NF service instances of the same service type within an NF instance. The NF service instances in the same NF Service Set have access to the same context data. Currently in 5G networks, SMFs are brought into an SMF Set (see, e.g., 3GPP TS 29.502, Implementation Stage 3).

Figure 2:
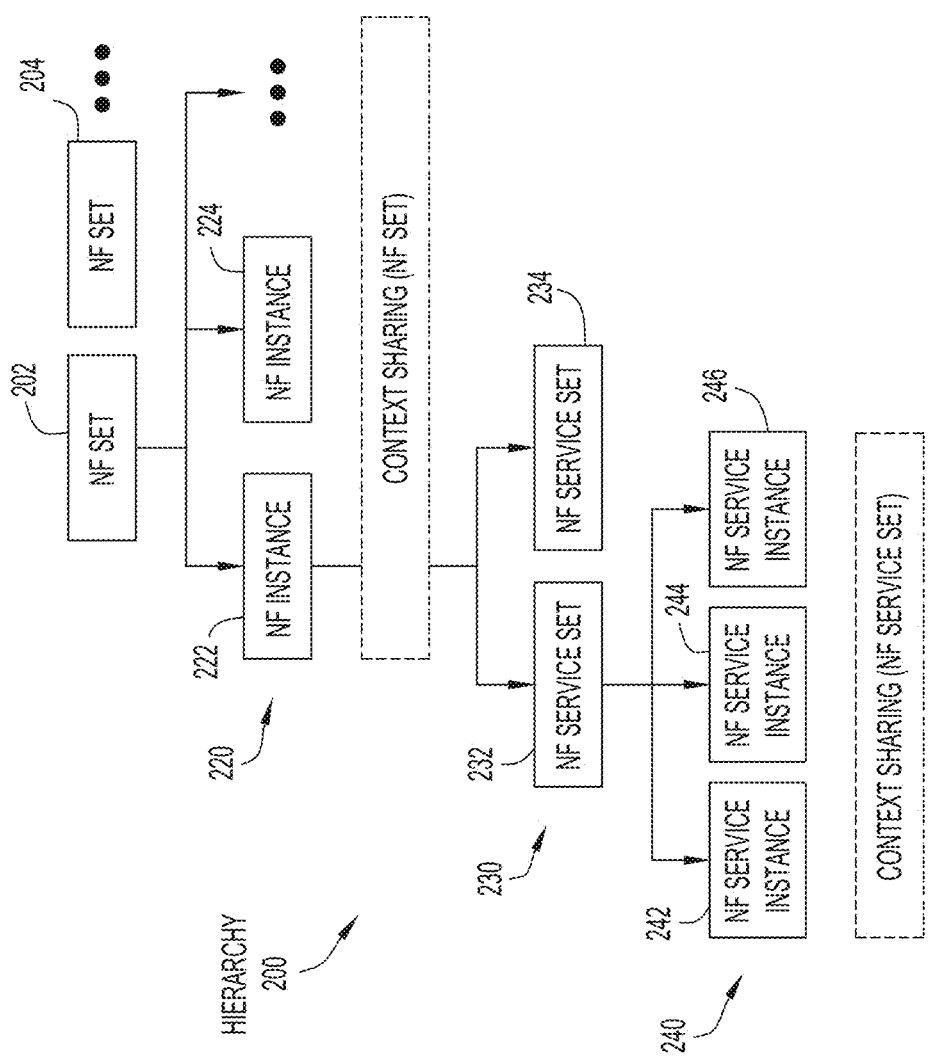
FIG. 2 is an illustration of a network function (NF) hierarchy of an NF Set, which includes NF instances, NF Service Sets and NF service instances.

To illustrate, FIG. 2 shows a hierarchy 200 of an NF Set 202. NF Set 202 may be associated with a plurality of NF instances 220 (e.g., an NF instance 222 and an NF instance 224). As illustrated, NF instance 222 of NF Set 202 is configured to have access to context data for processing, and NF instance 224 of the same NF Set 202 is configured to have access to the same context data for processing as the NF instance 222 (e.g., whether such access involves the same or different physical memory or location). The plurality of NF instances 220 of NF Set 202 are distinguishable from NF instances of an NF Set 204. For example, the plurality of NF instances 220 of NF Set 202 do not have access to the same context data as NF instances of NF Set 204.

An NF instance may be associated with a plurality of different NF Service Sets. For example, NF instance 222 may be associated with a plurality of NF Service Sets 230 (e.g., an NF Service Set 232 and an NF Service Set 234). An NF Service Set may be associated with a plurality of different NF service instances. In the example of FIG. 2, NF Service Set 232 may be associated with a plurality of NF service instances 240 (e.g., an NF service instance 242, an NF service instance 244, and an NF service instance 246). As illustrated, NF service instance 242 of NF Service Set 232 is configured to have access to context data for processing, and NF service instances 244 and 246 of the same NF Service Set 232 are configured to have access to the same context data for processing as the NF service instance 242 (e.g., whether such access involves the same or different physical memory or location). The plurality of NF service instances 240 of NF Service Set 232 are distinguishable from NF service instances of NF Service Set 234. For example, the plurality of NF service instances 240 of NF Service Set 232 do not have access to the same context data as NF service instances of NF Service Set 234.

An NF service is one type of capability exposed by an NF (e.g., an NF service "producer") to other authorized NFs (e.g., one or more NF service "consumers"). 3GPP TS 23.501 defines the roles of consumer and producer NFs. A consumer is the NF which requests a related service, while the NF which exposes the requested service is the producer. A target Uniform Resource Indicator (URI) may be used to access an NF service of an NF service producer (e.g., to invoke service operations). An endpoint address may be used to determine a host/authority part of a target URI. The endpoint address may be an address in the format of an IP address or Fully-Qualified Domain Name (FQDN). Each NF (service) instance in an NF (Service) Set may expose a different resource URI, provided to the NRF in NF profile information that is received during registration.

What are described herein are techniques and mechanisms for use in facilitating communications for devices connecting in vertical networks (e.g., industry-specific private 5G networks) using authentication services of an operator network (i.e., a PLMN), with use of a UDM set of UDM instances spread across both the operator and vertical networks.

According to some implementations of the present disclosure, a device may initiate registration in the operator network via an operator AMF, where authentication is performed with use of an operator UDM in the operator network. After successful registration and authentication in the operator network, successful registration status for the device is pushed or set in the vertical UDM in the vertical network and the device is provided with an address of the vertical AMF. The device will then send subsequent service requests to the vertical AMF, where subsequent service authorizations for the device are performed with use of the vertical UDM in the vertical network.

In some implementations, the following more detailed procedures may be made:
1. Bring the UDMs, i.e., the "operator" UDM and the "vertical" UDMs, in a single UDM set. The concept of an NF Set is well-defined in 3GPP TS 23.501, 23.502 for all control plane NFs, but currently its use is limited to the SMF (see, e.g., 3GPP TS 29.502). Thus, there will exist an operator UDM and a vertical UDM in a single UDM set.
2. The UDMs in the UDM set may share context using an "NF/NF Service Push Context procedure" defined in 3GPP TS 23.502 which is extended for the UDM Set.
3. The devices in the vertical network will have the information stored as part of its subscription information in its respective vertical network's UDM and the operator network's UDM. If there are different types of vertical networks deployed, then only the UDM of the appropriate vertical network will have this information (e.g., "manufacturing" devices will have a flag enabled only in the manufacturing network, and "mining" devices will have a flag enabled only in the mining network, etc.).

Figure 3:
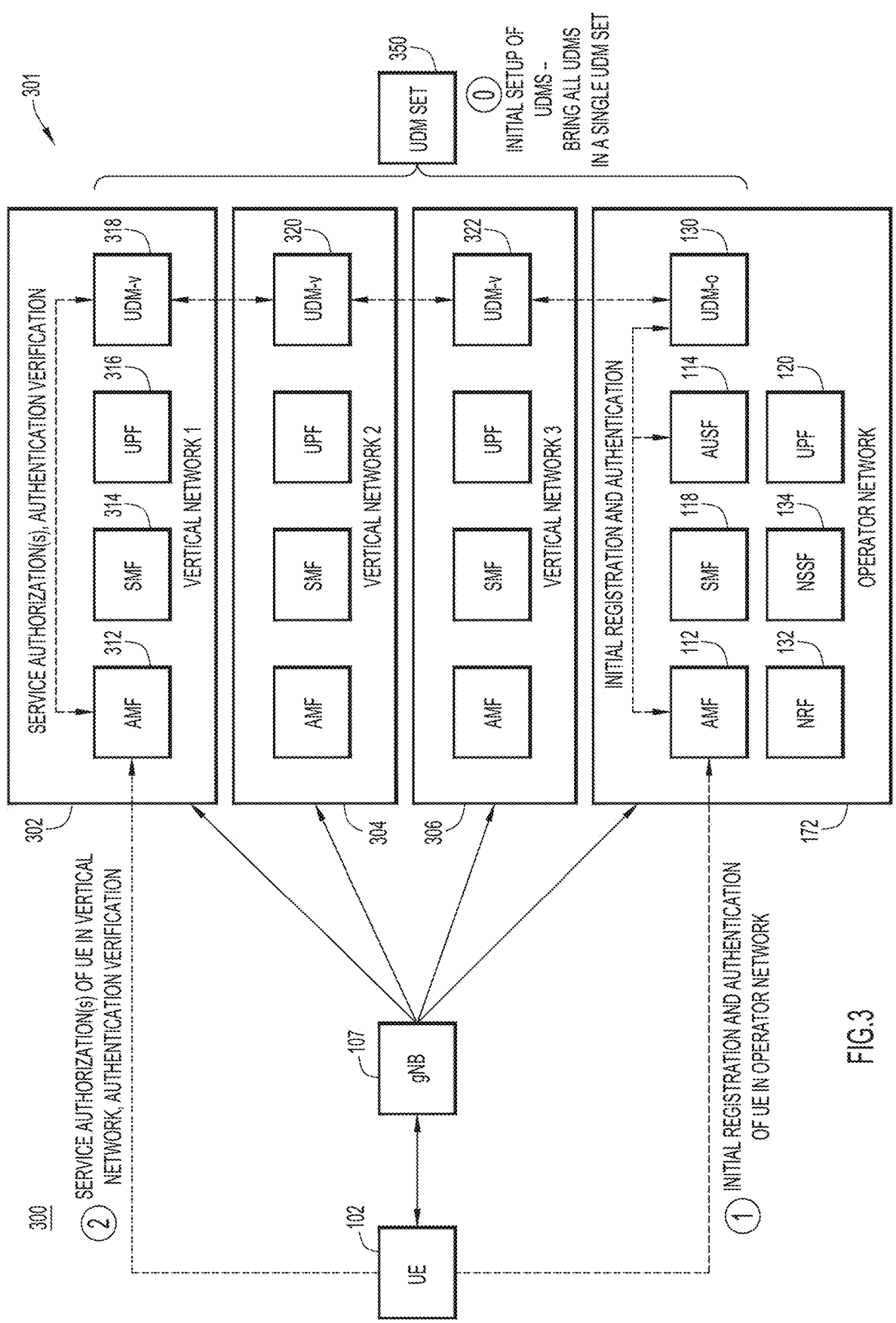
FIG. 3 is an illustrative representation of a communication system which includes an operator network and a plurality of vertical networks which have a plurality of Unified Data Management (UDM) instances that are brought into a UDM set.

To better explain in relation to the figures, FIG. 3 is an illustrative representation of a communication system 300 which includes operator network 172 (e.g., of FIGS. 1A-1B) and a plurality of vertical networks 301. As described above, the plurality of vertical networks 301 will co-exist with operator network 172 and uses limited services of operator network 172, as will be further explained. The plurality of vertical networks 301 shown in FIG. 3 include a vertical network 302 ("Vertical Network 1"), a vertical network 304 ("Vertical Network 2"), and a vertical network 306 ("Vertical Network 3").

The plurality of vertical networks may be characterized as local, private mobile networks. In some implementations, the plurality of vertical networks 301 are (all) different, industry-specific types of vertical networks. In some implementations, each vertical network includes only specific, limited types of NFs or variants thereof (e.g., includes only AMF, SMF, UPF, and UDM functions or variants thereof). For example, vertical network 302 may include (only) an AMF 312, an SMF 314, a UPF 316, and a UDM instance 318.

Operator network 172 and the plurality of vertical networks 301 are shown to utilize a plurality of UDM instances that have been established or brought into a (single) UDM set 350 (step(s) "0" of FIG. 3). UDM set 350 includes UDM 130 of operator network 172 (indicated as "UDM-o" in FIG. 3) and a UDM instance 318 of vertical network 302, a UDM instance 320 of vertical network 304, and a UDM instance 322 of vertical network 306 (each indicated as "UDM-v" in FIG. 3).

The plurality of vertical networks 301 will use (some and/or limited) services of operator network 172 for procedures, such as device authentication, prior to device attachment to a vertical network. Thus, initial registration and authentication procedures for a UE may be performed via the mechanisms in operator network 172 (e.g., UDM 130/AUSF 114) (step(s) "1" of FIG. 3). This is advantageous for security reasons (e.g., so that authentication credentials may be maintained within operator network 172). On the other hand, service authorizations for a UE (or other subscription-related use cases) may be performed via the mechanisms in each vertical network (e.g., UDM instance 318 of vertical network 302) (step(s) "2" of FIG. 3). Additionally or alternatively, authentication verification or confirmation that a UE has been authenticated in operator network 172 may be performed via the mechanisms in each vertical network (e.g., UDM instance 318 of vertical network 302) (again step(s) "2" of FIG. 3).

Thus, the UDM instances (e.g., UDM 130 in operator network 172 and UDM instances 318, 320, and 322 in vertical networks 302, 304, and 306, respectively) may be regularly synchronized (if and as needed). Each vertical network may be made aware of whether or not the device (e.g., UE 102) was already authenticated in operator network 172. Also advantageously, traffic and procedures that would otherwise be performed in operator network 172 may be reduced or eliminated once the device (e.g., UE 102) has been authenticated in operator network 172 and registered in the vertical network.

Figure 4:
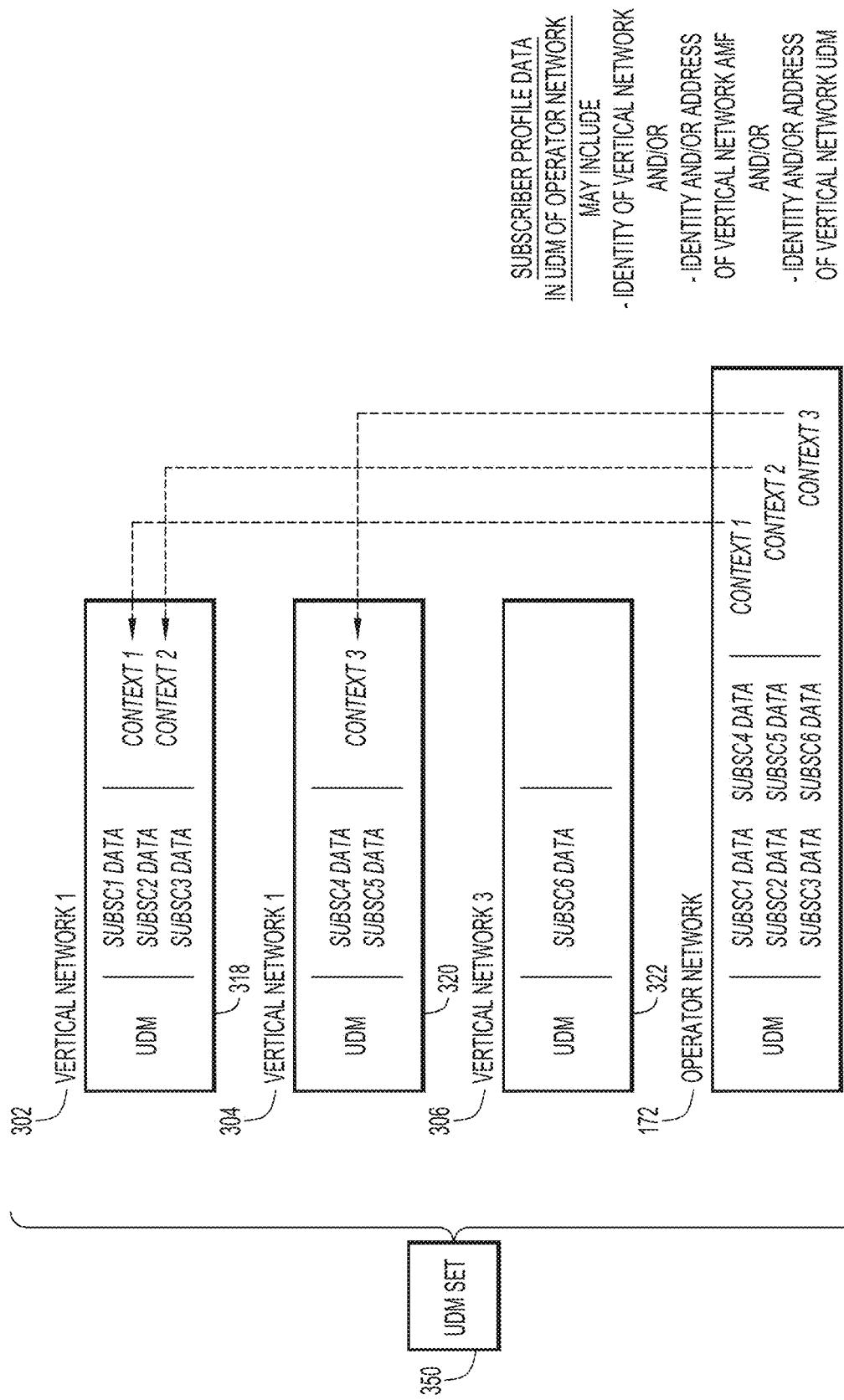
FIG. 4 is an illustrative representation of the plurality of UDM instances of the UDM set, which includes an example storage scenario for subscription profile data according to some implementations of the present disclosure.

FIG. 4 is an illustrative representation of the plurality of UDM instances of the UDM set 350, which includes an example storage scenario for subscription profile data according to some implementations of the present disclosure. UDM 130 of operator network 172 is operative to provide access to a plurality of subscription profiles associated with a plurality of subscribers in operator network 172. In the example of FIG. 4, the plurality of subscription profiles include six (6) subscription profiles (e.g., subsc1 data, subsc2 data, subsc3 data, subsc4 data, subsc5 data, and subsc6 data) associated with six (6) subscribers in operator network 172.

On the other hand, UDM instance 318 of vertical network 302 is operative to provide access to a first subset of the subscription profiles associated with a first subset of subscribers/users of vertical network 302. In the example of FIG. 4, the first subset of the subscription profiles in vertical network 302 includes three (3) subscription profiles (e.g., subsc1 data, subsc2 data, and subsc3 data) associated with three (3) subscribers/users of vertical network 302. Further, UDM instance 320 of vertical network 304 is operative to provide access to a second subset of the subscription profiles associated with a second subset of subscribers/users of vertical network 304. In the example of FIG. 4, the second subset of the subscription profiles in vertical network 304 includes two (2) subscription profiles (e.g., subsc4 data and subsc5 data) associated with two (2) subscribers/users of vertical network 304. Even further, UDM instance 322 of vertical network 306 is operative to provide access to a third subset of the subscription profiles associated with a third subset of subscribers/users of vertical network 306. In the example of FIG. 4, the third subset of the subscription profiles in vertical network 306 includes one (1) subscription profile (e.g., subsc6 data) associated with one (1) subscriber/user of vertical network 306.

In some implementations, subscription profiles for each subset of the subscription profiles may be pushed (e.g., one at a time or in batch) from the UDM 130 of operator network 172 to the appropriate UDM instance of a vertical network. Such a procedure may be performed upon initial setup of the vertical network, and then regularly upon the addition of additional subscribers/users in the vertical network. For example, UDM 130 of operator network 172 may push the first subset of the subscription profiles (e.g., subsc1 data, subsc2 data, and subsc3 data) to UDM instance 318 of vertical network 302. Also, for example, UDM 130 of operator network 172 may push the second subset of the subscription profiles (e.g., subsc3 data and subsc4 data) to UDM instance 320 of vertical network 304.

In some implementations, context associated with each subscriber or UE may be pushed (e.g., triggered upon change, or regularly, etc.) from the UDM 130 of operator network 172 to the appropriate UDM instance of a vertical network. Each context may be stored in or in relation to the subscriber profile data associated with the subscriber/UE. For example, UDM 130 of operator network 172 may push context (e.g., a context 1) for one of the subscribers/users to UDM instance 318 of vertical network 302. Also, for example, UDM 130 of operator network 172 may push another context (e.g., a context 2) for one of the subscribers/users to UDM instance 320 of vertical network 304.

As indicated in FIG. 4, subscriber profile data which may be included for use in UDM 130 associated with some implementations of the present disclosure may include, for example, an identity of the vertical network associated with the subscriber (or UE); an identity and/or an address of a vertical network AMF for use in the vertical network; and/or an identity and/or an address of a vertical network UDM instance for use in the vertical network.

Figure 5A:
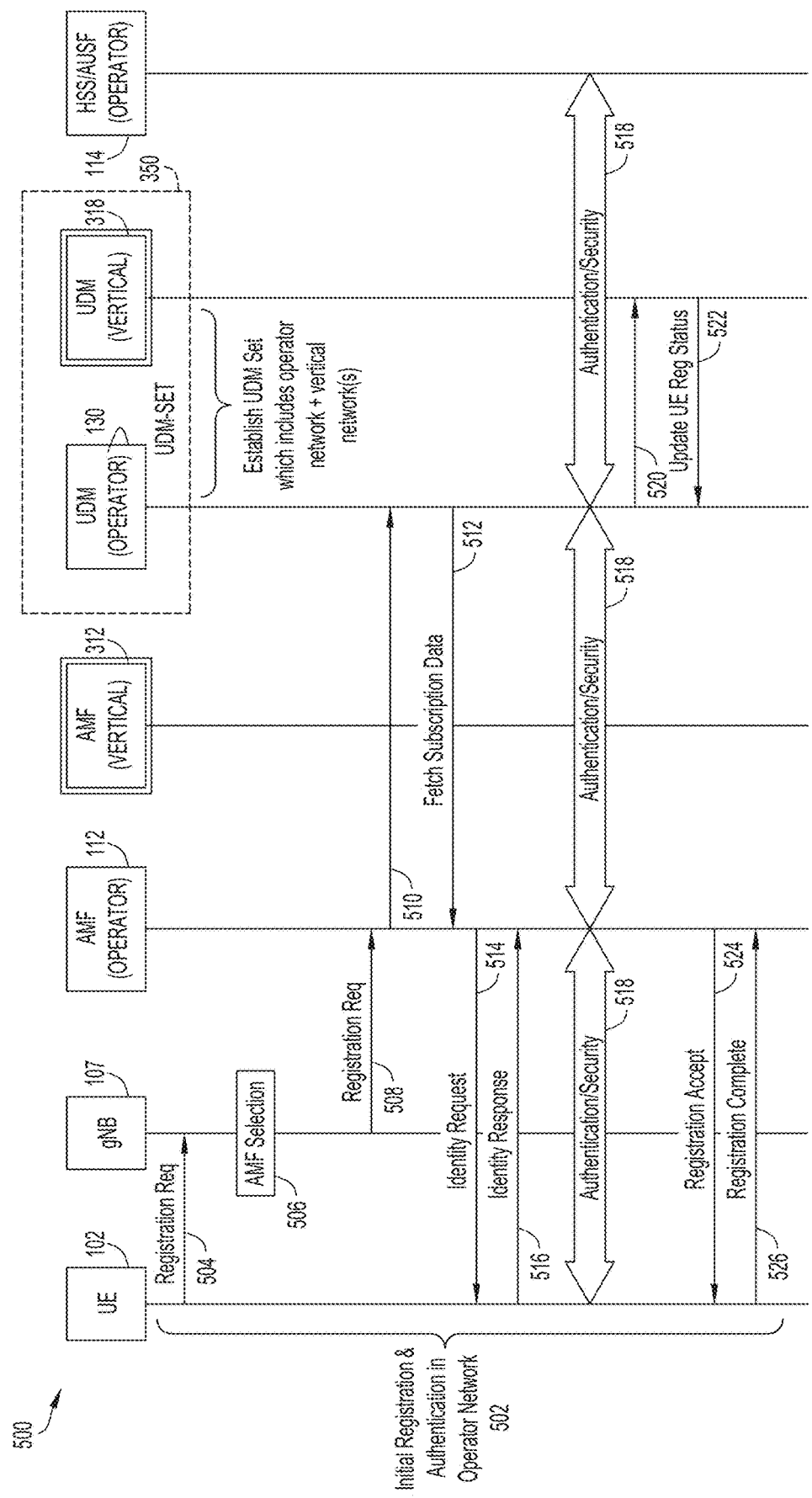
FIGS. 5A-5B form a call flow diagram of a call flow to facilitate services for devices in private mobile networks based on device authentications in a mobile network according to some implementations of the present disclosure.
Figure 5B:
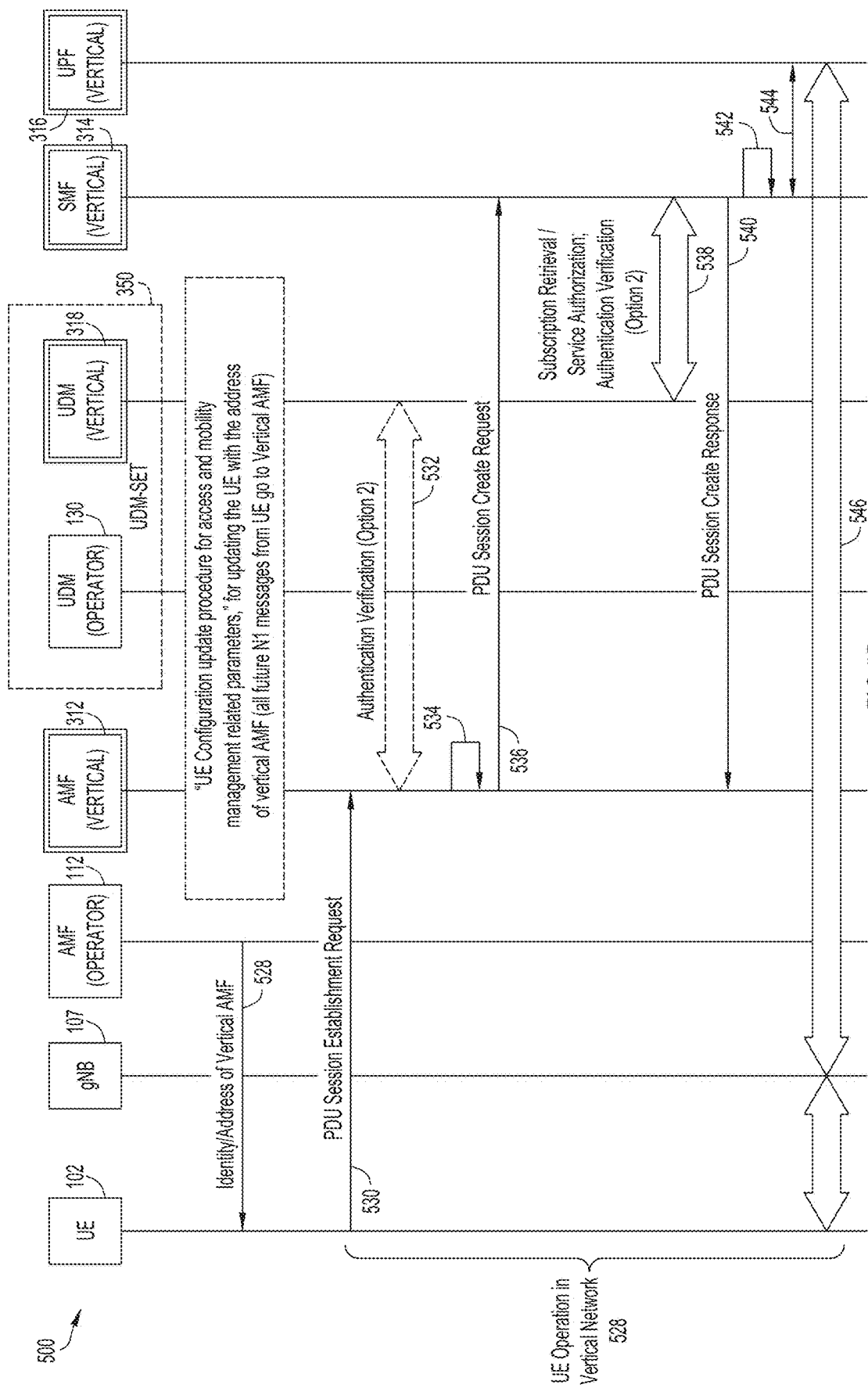

FIGS. 5A-5B form a call flow diagram 500 of a call flow to facilitate services for devices in private mobile networks (e.g., vertical networks) based on device authentications in a mobile network according to some implementations of the present disclosure.

Prior to discussion of the detailed messaging/processing steps in the call flow of FIGS. 5A-5B, the following overview steps are provided (e.g., in relation to a specific implementation):

1. Bring all the UDMs in a UDM Set as described herein.
2. Configure the operator UDM with subscription information for all of the UEs, and configure each vertical UDM with subscription information only for the UEs that are allowed to access the associated vertical network.
3. UE subscription information for a UE may include a flag/information which indicates which vertical network it belongs to. In some implementations, absence of the flag/information for a given UE may indicate that a UE session for the UE should be anchored in the operator network.
4. All the UEs may use the services of the operator AMF while registered with the 5G network. If the vertical AMF is selected by the gNB for the UE, then the vertical AMF may re-route the message to the operator AMF (e.g., after checking the flag/information of the vertical network in the UE subscription information). Here, a registration procedure with AMF re-reroute as defined in 3GPP TS 23.502 may be used.
5. Once the UE is authenticated in the operator network, then the operator UDM may push this information to the respective vertical UDM in the vertical network.
6. After successful registration (e.g., immediately thereafter), the operator AMF may trigger a "UE Configuration update procedure for access and mobility management related parameters" (section 4.2.4.2 of 3GPP TS 23.502) to update the UE with the address of vertical AMF. This configuration procedure will ensure that all the future N1 messages of the UE are sent to the vertical AMF.
7. Subsequently, after registration, the vertical AMF and other NFs (e.g., the SMF) may use the vertical UDM for service authorization, verification/confirmation of operator network authentication/registration, or for any other purpose.

Now with specific reference to FIG. 5A, the call flow begins with an initial registration and authentication in the operator network (general operational procedure 502 of FIG. 5A). UE 102 may send to the operator network via the gNB 107 (the NG-RAN) a message which indicates a registration request for registration (step 504 of FIG. 5A). After selection of the AMF (step 506 of FIG. 5A), the message which indicates the registration request is forwarded to AMF 112 of the operator network (step 508 of FIG. 5A). AMF 112 of the operator network may manage a registration procedure for registering UE 102, which includes an authentication procedure for authentication of UE 102. AMF 112 will communicate with UDM 130 of the operator network to fetch subscription information associated with UE 102 (steps 510 and 512 of FIG. 5A). If necessary to obtain a subscription concealed identifier (SUCI) of UE 102, AMF 112 may send to UE 102 a message which indicates an identity request (step 514 of FIG. 5A) and, in response, receive from UE 102 a message which indicates an identity response (e.g., including the SUCI) (step 516 of FIG. 5A). In some implementations, an AUSF (e.g., AUSF 114) may be selected based on the SUCI.

The authentication procedure for authentication of UE 102 in the operator network may then be performed (steps 518 of FIG. 5A). More particularly, AMF 112 may send to AUSF 114 of the operator network a message for subscription authentication of UE 102. AUSF 114 may interact with UDM 130 of the operator network for appropriate processing, where UDM 130 communicates authentication data for authentication of UE 102. In some implementations, UDM 130 communicates the authentication data with AUSF 114, and AUSF 114 informs UDM 130 of the authentication result which may be stored.

After, or in response to, the (successful) authentication of UE 102 in the operator network, UDM 130 may push status information of UE 102 to UDM instance 318 of the vertical network associated with UE 102 (steps 520 and 522 of FIG. 5A). In some implementations, the status information is authentication status information and/or registration status information of UE 102. The information may be stored in or in relation to the subscription profile of the UE. The authentication/registration status information may indicate successful or unsuccessful UE authentication/registration, and/or include related context. In some implementations, UDM 130 may obtain from the subscription profile data associated with UE 102 an identity of the vertical network associated with UE 102 and/or an identity or an address of the vertical UDM instance (i.e., UDM instance 318 of the vertical network) to which to push the authentication status information. AMF 112 of the operator network may subsequently send to UE 102 a message which indicates a registration accept (step 524 of FIG. 5A) and, in response, AMF 112 may receive from UE 102 a message which indicates a registration complete (step 526 of FIG. 5A).

Continuing with the call flow diagram 500 in FIG. 5B, AMF 112 of the operator network may perform a configuration procedure with UE 102 (step 528 of FIG. 5B). The configuration procedure may be for configuring UE 102 with an identity or an address of AMF 312 of the vertical network associated with UE 102. In some implementations, AMF 112 of the operator network may identify, from the subscription profile data associated with UE 102, one of the vertical networks that is associated with UE 102. For example, AMF 112 may obtain an identity of the vertical network associated with UE 102 and/or the identity or the address of the vertical AMF for UE 102. In some implementations, the configuration procedure with UE 102 may be a UE configuration update procedure for access and mobility management related parameters, which may include sending to UE 102 a message which includes the identity or the address of AMF 312 of the vertical network associated with UE 102.

The configuration procedure may enable UE 102 to subsequently communicate a message which indicates a session establishment request to AMF 312 of the vertical network. This message may be for initiation of a session establishment procedure for UE 102 with use of UDM instance 318 of the vertical network which is included in the UDM set. In particular, AMF 312 of the vertical network may manage the session establishment procedure for UE 102 with use of UDM instance 318 of the vertical network.

Thus, the call flow continues with UE operation in the vertical network (general operational procedure of step 528 of FIG. 5B). UE 102 may send to AMF 312 of the vertical network a PDU session establishment request (step 530 of FIG. 5B). AMF 312 of the vertical network may receive this message, which may trigger an authentication verification with UDM instance 318 of the vertical network (step 532 of FIG. 5B) (as an Option 1). The authentication verification may include the checking of the authentication/registration status information of UE 102, by AMF 312 of the vertical network, to verify that UE 102 has successfully been registered/authenticated in the operator network. AMF 312 may perform procedures for managing the PDU session establishment request, including SMF selection for selection of an SMF (e.g., SMF 314 of the vertical network) (step 534 of FIG. 5B). AMF 312 may then send to SMF 314 a message which indicates a PDU session create request (step 536 of FIG. 5B).

SMF 314 may receive and process the message which indicates the PDU session create request. The processing at SMF 314 may include a subscription retrieval and service authorization associated with UE 102 (step 538 of FIG. 5B), with use of UDM instance 318 of the vertical network. Service authorization for UE 102 may be performed since UDM instance 318 of the vertical network has access to the subscriber profile for UE 102. In some implementations, SMF 314 may further perform an authentication verification with UDM instance 318 of the vertical network (as an Option 2), which may include checking of the authentication/registration status information of UE 102 to verify that UE 102 has successfully been registered/authenticated in the operator network. SMF 314 may perform procedures for the PDU session creation, including sending to AMF 312 a message which indicates a PDU session create response (step 540 of FIG. 5B), and performing UPF selection for selection of a UPF (e.g., UPF 316 of the vertical network) (step 542 of FIG. 5B). In addition, SMF 314 may create an N4 session/PFCP session with UPF 316 in an N4 establishment procedure (steps 544 of FIG. 5B). Accordingly, communication services are facilitated for UE 102 (e.g., traffic associated with UE 102 may be communicated) in the vertical network (steps 546 of FIG. 5B). The call flow of FIGS. 5A-5B may be repeated for each of one or more UE/subscribers in the same vertical network and/or different vertical networks.

Figure 6:
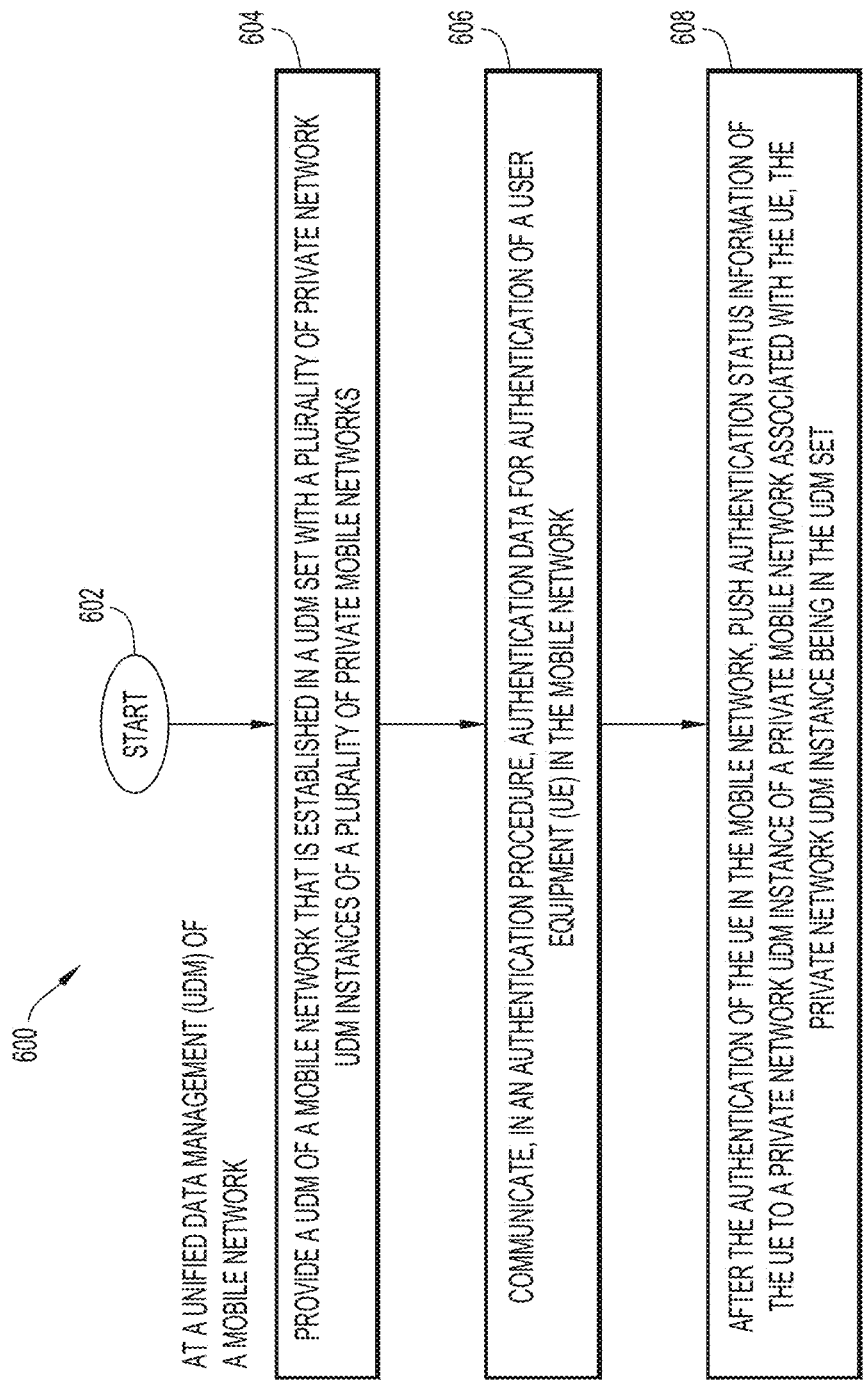
FIG. 6 is a flowchart for describing a method for use in facilitating services for devices in private mobile networks based on device authentications in a mobile network according to some implementations of the present disclosure, which may be performed by a UDM of a mobile network.

FIG. 6 is a flowchart 600 for describing a method for use in facilitating services for devices in private mobile networks based on device authentications in a mobile network according to some implementations of the present disclosure. The method of FIG. 6 may be performed by or with use of a UDM of the mobile network. In some implementations, the method of FIG. 6 (e.g., using the UDM) may be performed in cooperation with the method of FIG. 7 (e.g., using an AMF). The method of FIG. 6 may be embodied in a computer program product which includes a non-transitory computer readable medium and instructions stored in the non-transitory computer readable medium, where the instructions are executable by the one or more processors of a computer device for operation as the UDM.

Beginning at a start block 602, the UDM of the mobile network (e.g., a 3GPP-based mobile network or PLMN) may be established in a UDM set with a plurality of private network UDMs instances of a plurality of private mobile networks (e.g., vertical networks), respectively (step 604 of FIG. 6). The UDM of the mobile network may provide access to a plurality of subscription profiles associated with a plurality of subscribers of the mobile network. On the other hand, each private network UDM instance may provide access to a subset of the subscription profiles associated with a subset of the subscribers in a corresponding private mobile network (including a subscription profile of a subscriber associated with a UE involved in the present method).

The mobile network may receive, from the UE, a message which indicates a registration request. The mobile network may proceed to manage and perform a registration procedure for the UE. The registration procedure may include an authentication procedure for the UE. In the authentication procedure, the UDM may communicate authentication data for authentication of the UE in the mobile network (step 606 of FIG. 6). After the authentication of the UE in the mobile network, the UDM may push authentication status information of the UE a private network UDM instance of a private mobile network associated with the UE (step 608 of FIG. 6). The private network UDM instance of the private mobile network may be included the UDM set. In some implementations, the authentication status information may be stored in or in relation to the subscription profile of the UE. The authentication status information may indicate successful or unsuccessful UE authentication and/or related context. In some implementations, the UDM of the mobile network may communicate the authentication data with the AUSF, and/or the AUSF may inform the UDM of the mobile network with the authentication result (which may be stored). When the UE subsequently communicates a service request (e.g., a PDU session establishment request) in the private mobile network, the authentication status information may be used for authentication verification or confirmation that the UE has already been authenticated in the mobile network.

In some implementations, the UDM of the mobile network may obtain, from subscription profile data of the UE, an identity of the private mobile network associated with the UE and/or an identity or an address of the private network UDM instance to which to push the authentication status information. Here, the UDM of the mobile network may push the authentication status information of the UE to the private network UDM instance of the private mobile network based on the identity of the private mobile network and/or the identity or the address of the private network UDM instance of the private mobile network. For synchronization of the UDMs, the UDM of the mobile network may communicate context(s) to the private network UDM instance of the private mobile network, e.g., with use of an NF push context procedure.

In some implementations, subscription profiles of each subset of the subscription profiles in the mobile network may be pushed (e.g., one at a time or in batch) from the UDM of the mobile network to the appropriate private network UDM instance of the private mobile network. For example, the UDM of the mobile network may push a first subset of the subscription profiles to a first private network UDM instance of a first private mobile network of the plurality of private mobile networks, where the first subset of the subscription profiles is associated with a first subset of subscribers in the first private mobile network. To further the example, the UDM of the mobile network may also push a second subset of the subscription profiles to a second private network UDM instance of a second private mobile network of the plurality of private mobile networks, where the second subset of the subscription profiled is associated with a second subset of subscribers in the second private mobile network.

In some implementations, the method of FIG. 6 may be repeated/continued for each one of a plurality of UEs associated with a plurality of subscribers in the mobile network and operative in at least one of the private mobile networks. For example, in the above-described method, if the UE is a first UE, the private network UDM instance of the private mobile network is a first private network UDM instance of a first private mobile network, the authentication procedure is a first authentication procedure, and the authentication status information is first authentication status information, then the method may proceed as follows. The mobile network may manage and perform a registration procedure for the second UE, and this includes a second authentication procedure for the second UE. In the second authentication procedure for the second UE, the UDM may communicate second authentication data for authentication of the second UE in the mobile network. After the authentication of the second UE in the mobile network, the UDM may push second authentication status information of the second UE to a second private network UDM instance of a second private mobile network associated with the second UE. The second private network UDM instance of the second private mobile network may be included the UDM set. The second authentication status information may indicate successful or unsuccessful UE authentication and/or related context. When the second UE subsequently communicates a service request (e.g., a PDU session establishment request) in the second private mobile network, the second authentication status information may be used for authentication verification or confirmation that the second UE has already been authenticated in the mobile network.

Figure 7:
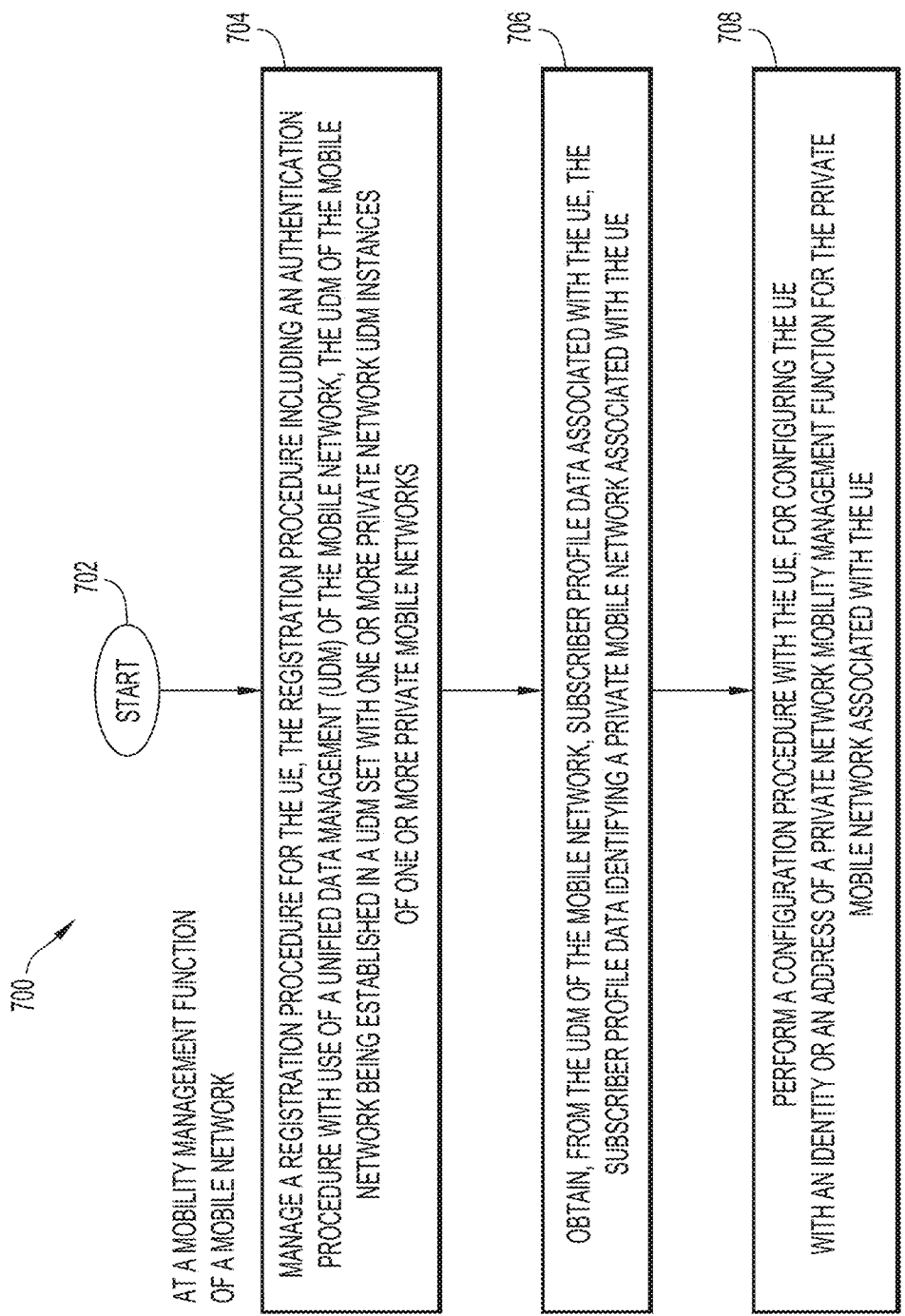
FIG. 7 is a flowchart for describing a method for use in facilitating services for devices in private mobile networks based on device authentications in a mobile network according to some implementations of the present disclosure, which may be performed by a mobility management function (e.g., an AMF) of a mobile network.

FIG. 7 is a flowchart 700 for describing a method for use in facilitating services for devices in private mobile networks based on device authentications in a mobile network according to some implementations of the present disclosure. The method of FIG. 7 may be performed by or with use of a mobility management function (e.g., an AMF) of the mobile network. In some implementations, the method of FIG. 7 (e.g., the AMF) may be performed in cooperation with the method of FIG. 6 (e.g., the UDM). The method of FIG. 7 may be embodied in a computer program product which includes a non-transitory computer readable medium and instructions stored in the non-transitory computer readable medium, where the instructions are executable by the one or more processors of a computer device for operation as the mobility management function (e.g., an AMF).

In the method of FIG. 7, a UDM of the mobile network (e.g., a 3GPP-based mobile network or PLMN) may be established in a UDM set with a plurality of private network UDMs instances of a plurality of private mobile networks (e.g., vertical networks), respectively. The UDM of the mobile network may provide access to a plurality of subscription profiles associated with a plurality of subscribers of the mobile network. On the other hand, each private network UDM instance may provide access to a subset of the subscription profiles associated with a subset of the subscribers in a corresponding private mobile network (including a subscription profile of a subscriber associated with a UE involved in the present method).

The mobile network may receive, from the UE, a message which indicates a registration request. In response, the mobile network may proceed to manage and perform a registration procedure for the UE. In particular, beginning at a start block 702 of FIG. 7, the mobility management function of the mobile network may manage a registration procedure for the UE (step 704 of FIG. 7). The registration procedure may include an authentication procedure with use of the UDM of the mobile network, which is included in the UDM set as described above. In the registration procedure, the mobility management function may obtain, from the UDM of the mobile network, subscription profile data associated with the UE (step 706 of FIG. 7). The subscription profile data may identify one of the private mobile networks that is associated with the UE. Subsequently, the mobility management function may perform a configuration procedure with the UE, for configuring the UE with an identity or an address of a private network mobility management function of the private mobile network associated with the UE (step 708 of FIG. 7).

The configuration procedure may be for enabling the UE to communicate a message which indicates a session establishment request to the private network mobility management function of the private mobile network. This message may be for initiation of a session establishment procedure for the UE with use of a private network UDM instance of the private mobile network which is included in the UDM set. In particular, the private network mobility management function of the private mobile network may manage the session establishment procedure for the UE with use of a private network UDM instance of the private mobile network, where the private network UDM instance is included in the UDM set.

In some implementations, the UDM of the mobile network may be configured to communicate authentication status information to the private network UDM instance of the private mobile network after authentication of the UE in the mobile network. In some implementations, the UDM of the mobile network may be configured to communicate context(s) to the private network UDM instance of the private mobile network, with use of an NF push context procedure.

Figure 8:
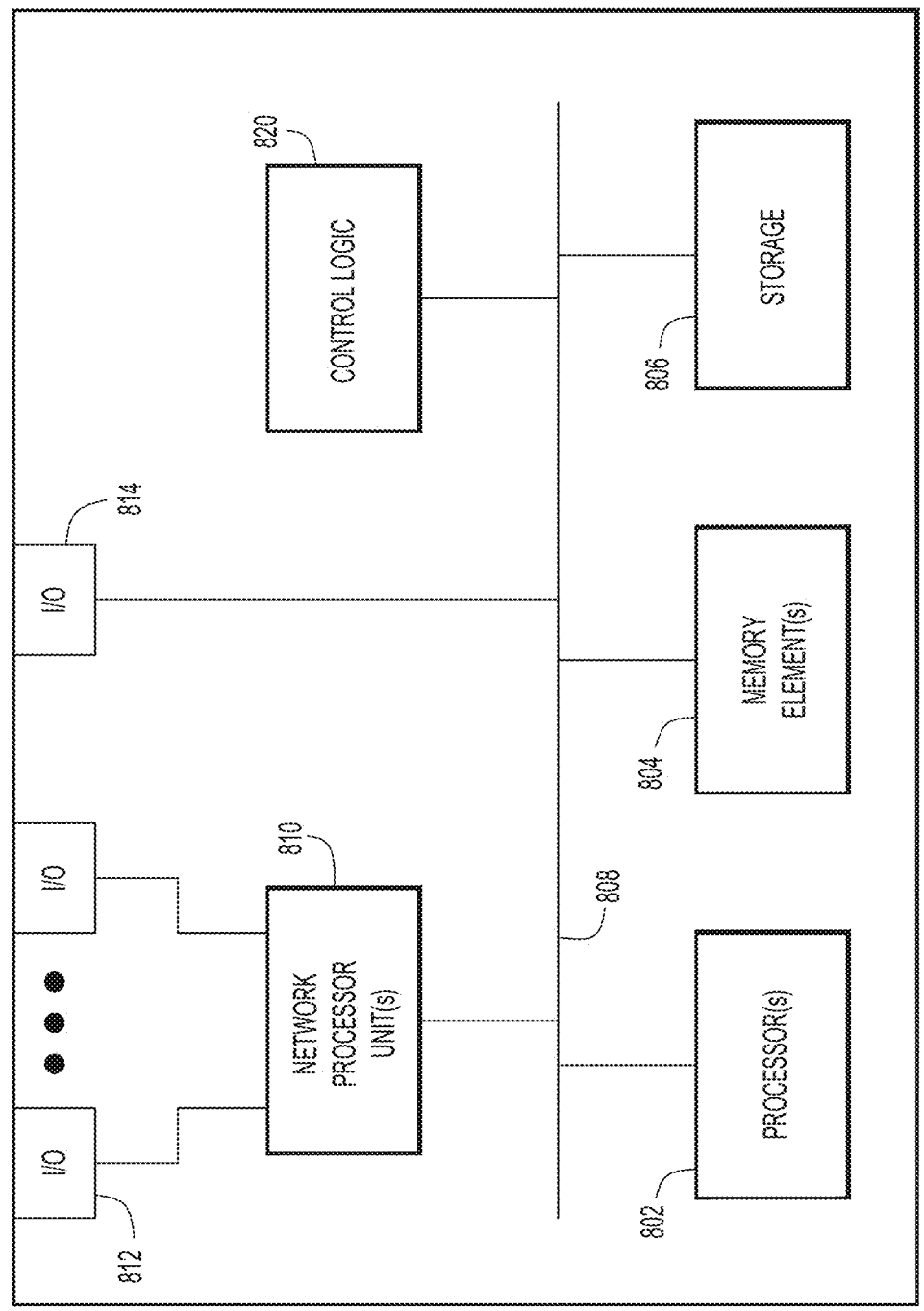
FIG. 8 illustrates a hardware block diagram of a computing device that may perform functions associated with operations of a control plane function entity according to some implementations of the present disclosure.

FIG. 8 illustrates a hardware block diagram of a computing device 800 that may perform functions associated with operations discussed herein in connection with the techniques described in relation to the above figures. In various embodiments, a computing device, such as computing device 800 or any combination of computing devices 800, may be configured as any entity/entities as discussed for the techniques depicted in connection with the figures in order to perform operations of the various techniques discussed herein. In particular, computing device 800 may perform operations of a control plane function entity (e.g., one or more control plane function entities in a 3GPP-based mobile network; e.g., a UDM, an AMF, functional variants thereof, etc.), for operation in accordance with the method of FIG. 6 or FIG. 7 and/or associated techniques and mechanisms described herein.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Techniques and mechanisms are described herein for facilitating services for devices in private mobile networks based on device authentications in an operator network and use of a UDM set. In one illustrative example, a UDM of a mobile network is established in a UDM set with a plurality of private network UDMs instances of a plurality of private mobile networks. The UDM of the mobile network provides access to a plurality of subscription profiles associated with a plurality of subscribers of the mobile network, and a private network UDM instance provides access to a subset of the subscription profiles associated with a subset of the subscribers in a private mobile network. The UDM of the mobile network operates to communicate, in an authentication procedure, authentication data for authentication of a UE in the mobile network. After the authentication of the UE in the mobile network, the UDM of the mobile network operates to push authentication status information of the UE to the private network UDM instance of the private mobile network associated with the UE.

In another illustrative example, a mobility management function for use in a mobile network operates to manage a registration procedure for the UE. The registration procedure includes an authentication procedure with use of a UDM of the mobile network, where the UDM is established in a UDM set with one or more private network UDMs instances of one or more private mobile networks. In the registration procedure, the mobility management function of the mobile network operates to obtain, from the UDM of the mobile network, subscription profile data associated with the UE. The subscription profile data identifies one of the private mobile networks associated with the UE. The mobility management function operates to perform a configuration procedure with the UE, for configuring the UE with an identity or an address of a private network mobility management function of the private mobile network associated with the UE. The configuration procedure enables the UE to communicate a message which indicates a session establishment request to the private network mobility management function of the private mobile network. This message is for initiation of a session establishment procedure for the UE with use of a private network UDM instance of the private mobile network, where the private network UDM instance is in the UDM set.

In relation to the above illustrative examples, a network node may comprise one or more processors; one or more interfaces to connect for network communication; one or more memory elements for storing instructions executable by the one or more processors for operation as a control plane function entity (e.g., for mobility management), including for performing the processing/messaging steps of the method(s) as described. In addition, a computer program product may comprise a non-transitory computer readable medium and instructions stored in the non-transitory computer readable medium, where the instructions are executable by one or more processors of a network node having a control plane function entity (e.g., for mobility management), including for performing the processing/messaging steps of the method(s) as described.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN)(e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combined multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   at a unified data management (UDM) of a mobile network, which is established in a UDM set with a plurality of private network UDMs instances of a plurality of private mobile networks, respectively,
      communicating, in an authentication procedure, authentication data for authentication of a user equipment (UE) in the mobile network; and
      after the authentication of the UE in the mobile network, pushing authentication status information of the UE to a private network UDM instance of a private mobile network associated with the UE, the private network UDM instance being in the UDM set.

2. The method of claim 1, further comprising:
   at the UDM of the mobile network,
      obtaining, from subscription profile data of the UE, an identity of the private mobile network associated with the UE and/or an identity or an address of the private network UDM instance to which to push the authentication status information.

3. The method of claim 2, wherein pushing the authentication status information of the UE to the private network UDM instance of the private mobile network is performed based on the identity of the private mobile network and/or the identity or the address of the private network UDM instance of the private mobile network.

4. The method of claim 1, further comprising:
at the UDM of the mobile network,
communicating a context to the private network UDM instance of the private mobile network with use of a network function (NF) push context procedure.

5. The method of claim 1, further comprising:
at the UDM of the mobile network,
providing access to a plurality of subscription profiles associated with a plurality of subscribers in the mobile network, and
wherein the private network UDM instance is operative to provide access to a subset of the subscription profiles associated with a subset of the subscribers in the private mobile network, the subset of the subscription profiles of the private mobile network including a subscription profile of a subscriber associated with the UE.

6. The method of claim 1, wherein the private network UDM instance of the private mobile network comprises a first private network UDM instance of a first private mobile network, the method further comprising:
at the UDM of the mobile network,
providing access to a plurality of subscription profiles associated with a plurality of subscribers in the mobile network;
pushing a first subset of the subscription profiles to the first private network UDM instance of the first private mobile network of the plurality of private mobile networks, the first subset of the subscription profiles being associated with a first subset of subscribers in the first private mobile network; and
pushing a second subset of the subscription profiles to a second private network UDM instance of a second private mobile network of the plurality of private mobile networks, the second subset of the subscription profiles being associated with a second subset of subscribers in the second private mobile network.

7. The method of claim 1, wherein the authentication procedure comprises a first authentication procedure, the authentication status information comprises first authentication status information, the UE comprises a first UE, the private network UDM instance of the private mobile network comprises a first private network UDM instance of a first private mobile network, the method further comprising:
at the UDM of the mobile network,
communicating, in a second authentication procedure, second authentication data for authentication of a second UE in the mobile network; and
after the authentication of the second UE in the mobile network, pushing second authentication status information of the second UE to a second private network UDM instance of a second private mobile network associated with the second UE, the second private network UDM instance being in the UDM set.

8. A method comprising:
at a mobility management function for use in a mobile network,
managing a registration procedure for a user equipment (UE), the registration procedure including an authentication procedure with use of a unified data management (UDM) of the mobile network, the UDM of the mobile network being established in a UDM set with one or more private network UDMs instances of one or more private mobile networks, respectively;
obtaining, from the UDM of the mobile network, subscription profile data associated with the UE, the subscription profile data identifying one of the private mobile networks associated with the UE; and
performing a configuration procedure with the UE, for configuring the UE with an identity or an address of a private network mobility management function of the private mobile network associated with the UE.

9. The method of claim 8, wherein performing the configuration procedure with the UE is for enabling the UE to communicate a message which indicates a session establishment request to the private network mobility management function of the private mobile network, for initiation of a session establishment procedure for the UE with use of a private network UDM instance of the private mobile network, the private network UDM instance being in the UDM set.

10. The method of claim 9, wherein the UDM of the mobile network is configured to communicate authentication status information to the private network UDM instance of the private mobile network after authentication of the UE in the mobile network.

11. The method of claim 9, wherein the UDM of the mobile network is configured to communicate a context to the private network UDM instance of the private mobile network with use of a network function (NF) push context procedure.

12. The method of claim 8, wherein performing the configuration procedure with the UE comprises performing a UE configuration update procedure for access and mobility management related parameters, which includes sending to the UE a message which includes the identity or the address of the private network mobility management function of the private mobile network associated with the UE.

13. The method of claim 8, further comprising:
at the private network mobility management function of the private mobile network associated with the UE,
managing a session establishment procedure for the UE with use of a private network UDM instance of the private mobile network, the private network UDM instance being in the UDM set.

14. The method of claim 8, wherein the mobility management function for use in the mobile network comprises an access and mobility management function (AMF), the private network mobility management function comprises a private network AMF, and the private mobile network comprises a vertical network.

15. A computer program product comprising:
a non-transitory computer readable medium;
instructions stored in the non-transitory computer readable medium;
the instructions being executable by one or more processors of a computing device for operation as a mobility management function of a mobile network, including:
managing a registration procedure for a user equipment (UE), the registration procedure including an authentication procedure with use of a unified data management (UDM) of the mobile network, the UDM of the mobile network being established in a UDM set with one or more private network UDMs instances of one or more private mobile networks, respectively;

obtaining, from the UDM of the mobile network, subscription profile data associated with the UE, the subscription profile data identifying a private mobile network associated with the UE; and performing a configuration procedure with the UE, for configuring the UE with an identity or an address of a private network mobility management function of the private mobile network associated with the UE.

16. The computer program product of claim 15, wherein the instructions are executable by the one or more processors of the computing device for performing the configuration procedure with the UE for enabling the UE to communicate a message which indicates a session establishment request to the private network mobility management function of the private mobile network, for initiation of a session establishment procedure for the UE with use of a private network UDM instance of the private mobile network, the private network UDM instance being in the UDM set.

17. The computer program product of claim 16, wherein the UDM of the mobile network is configured to push authentication status information of the UE to the private network UDM instance of the private mobile network after authentication of the UE in the mobile network.

18. The computer program product of claim 16, wherein the UDM of the mobile network is configured to communicate a context to the private network UDM instance of the private mobile network with use of a network function (NF) push context procedure.

19. The computer program product of claim 15, wherein the instructions are executable by the one or more processors of the computing device for performing the configuration procedure with the UE by performing a UE configuration update procedure for access and mobility management related parameters, which includes sending to the UE a message which includes the identity or the address of the private network mobility management function of the private mobile network associated with the UE.

20. The computer program product of claim 15, wherein the mobility management function comprises an access and mobility management function (AMF).

* * * * *